United States Patent
Fujii et al.

(10) Patent No.: US 6,480,450 B1
(45) Date of Patent: Nov. 12, 2002

(54) METHOD AND APPARATUS FOR RECORDING OPTICAL INFORMATION BY VARYING RECORDING PULSE WIDTH

(75) Inventors: Toru Fujii; Ryou Negishi; Masahiko Hirano, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/491,781

(22) Filed: Jan. 26, 2000

(51) Int. Cl.[7] .............................................. G11B 7/125
(52) U.S. Cl. ...................................................... 369/59.12
(58) Field of Search ............................ 369/59.11, 59.12

(56) References Cited

U.S. PATENT DOCUMENTS 4,928,187 A  *  5/1990  Rees ............................ 369/59
5,625,614 A  *  4/1997  Taniguchi .................... 369/116
5,774,433 A  *  6/1998  Rokutan ..................... 369/44.28

* cited by examiner

*Primary Examiner*—W. R. Young
*Assistant Examiner*—Gautam R. Patel
(74) *Attorney, Agent, or Firm*—Katten Muchin Zavis Rosenman

(57) ABSTRACT

A method and an apparatus capable of recording optical information at high density are disclosed. A recording pulse which includes a top pulse followed by a multiple pulse set is generated to form a pit, wherein, based on the distance from the top pulse, either pulse widths of pulses within the multiple pulse set are set to be sequentially smaller or pulse intervals of pulses within the multiple pulse set are set to be sequentially larger.

20 Claims, 8 Drawing Sheets

METHOD AND APPARATUS FOR RECORDING OPTICAL INFORMATION BY VARYING RECORDING PULSE WIDTH

FIELD OF THE INVENTION

The present invention relates to a method and an apparatus for recording optical information; and, more particularly, to a method and an apparatus capable of recording optical information at high density.

DESCRIPTION OF THE PRIOR ART

Optical recording techniques have been widely used in storing a large volume of information on an optical information recording medium, e.g., such an optical disc as CD-recordable (CD-R) or the like. Recently, there has been introduced a technique to record the optical information at a speed of or beyond 2 to 6 times the standard recording speed.

Recording of information on the optical disc is accomplished by irradiating a pulsed laser beam onto the rotating optical disc based on a digital signal, which has been obtained by digitizing the information to be recorded, to thereby form pits thereon.

In order to form the pits on the optical disc based on the digital signal, a high intensity laser beam is irradiated onto the optical disc during a high level of the digital signal, the pits being formed as a result of the high intensity laser beam causing a change of states in the recording layer being irradiated therewith. During a low level of the digital signal, a low intensity laser beam required for tracking is irradiated onto the disc.

Figure 2:
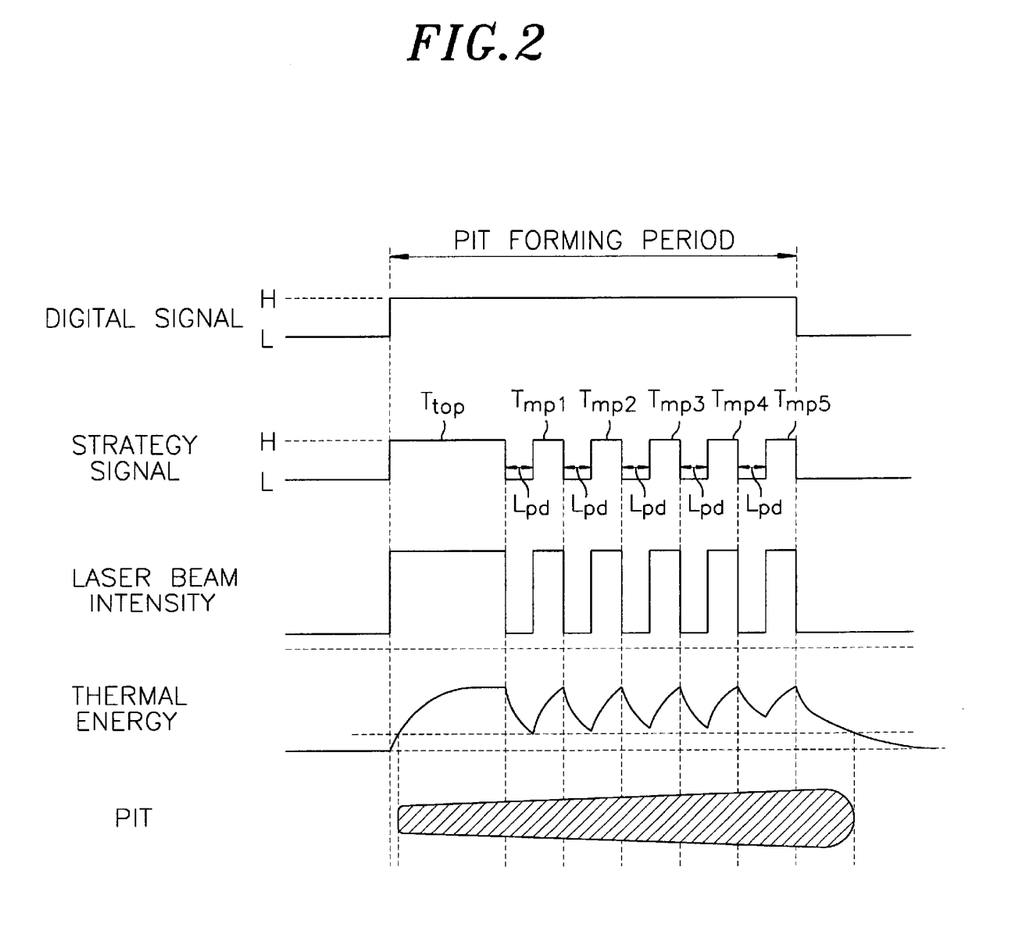
FIG. 2 represents a conventional method for recording optical information.

There is illustrated in FIG. 2 a conventional recording method comprising steps of generating a recording pulse while the digital signal corresponds to a high level during which a pit is formed, wherein the recording pulse includes a top pulse $T_{top}$ and a multiple pulse set $T_{mp1}$ to $T_{mpN}$, N being an integer, following the top pulse $T_{top}$; and irradiating a laser beam onto the optical information recording medium based on the recording pulse, thereby forming an optically detectable pit having a length corresponding to the first intensity level. In this conventional method, the pulses within the multiple pulse set $T_{mp1}$ to $T_{mpN}$ have not only the same pulse width but also the same pulse interval $L_{pd}$.

A high speed recording can be achieved by rotating an optical disc at an increased speed and reducing the period of a digital signal according to the rotational speed of the disc.

A digital versatile disc (DVD) capable of allowing a large volume of information to be recorded in a higher density than a compact disc (CD) has been recently introduced.

The conventional DVD is similarly shaped as the CD, i.e., a disc shaped, and can store about 7 times, i.e., 4.7 GB, as much information as the CD. Such a large information recording medium is expected to be a great contribution to the multimedia information society.

Further, as in the development of CDs, a DVD recordable (DVD-R) can not be omitted in the development of DVDs, and the present applicant has developed the DVD-R for a practical use. In the DVD-R, as in the CD-R, a pit is formed by irradiating a pulse shape laser beam onto the rotating optical disc based on the digital signal which has been generated by digitizing the information to be recorded.

Since, however, the DVD-R can store the optical information with a higher density in comparison to the CD-R, the conventional method and apparatus for recording optical information used for the CD-R can not be used. The use of the conventional method and apparatus for recording optical information used for the CD-R may result in a plurality of errors being recorded or the optical information may not get recorded at all.

For example, as a result of a track pitch, i.e., the minimum pit length of the DVD-R being smaller than that of the CD-R, an excessive thermal energy of the previous pit may influence the formation of the current pit, which, in turn, may prevent the pit from being formed at the required position, which may appear as a jitter during the reproduction of the optical information stored thereon.

SUMMARY OF THE INVENTION

It is, therefore, an object of the present invention to provide a method and apparatus capable of recording optical information correctly on an optical information recording medium with a high density.

In accordance with an aspect of the present invention, there is provided a method for recording optical information on an optical information recording medium based on a digital signal which has a first intensity level representing a period for forming a pit and a second intensity level representing a period for not forming the pit, the method comprising the steps of:

generating a recording pulse which includes a top pulse and a multiple pulse set following the top pulse while the digital signal corresponds to the first intensity level; and irradiating a laser beam onto the optical information recording medium based on the recording pulse, thereby forming an optically detectable pit having a length corresponding to the first intensity level, characterized in that pulse widths of pulses within the multiple pulse set are set to be sequentially smaller based on the distance from the top pulse.

In accordance with another aspect of the present invention, there is provided an apparatus for recording optical information on an optical information recording medium based on a digital signal which has a first intensity level representing a period for forming a pit and a second intensity level representing a period for not forming the pit, the apparatus comprising:

a recording pulse generator for generating a recording pulse which includes a top pulse and a multiple pulse set following the top pulse while the digital signal corresponds to the first intensity level, wherein pulse widths of pulses within the multiple pulse set are set to be sequentially smaller based on the distance from the top pulse; and a light source for irradiating a laser beam with a pulse shape onto the optical information recording medium based on the recording pulse, thereby forming an optically detectable pit having a length corresponding to the first intensity level on the optical information recording medium.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described hereinafter with reference to the drawings.

Figure 3:
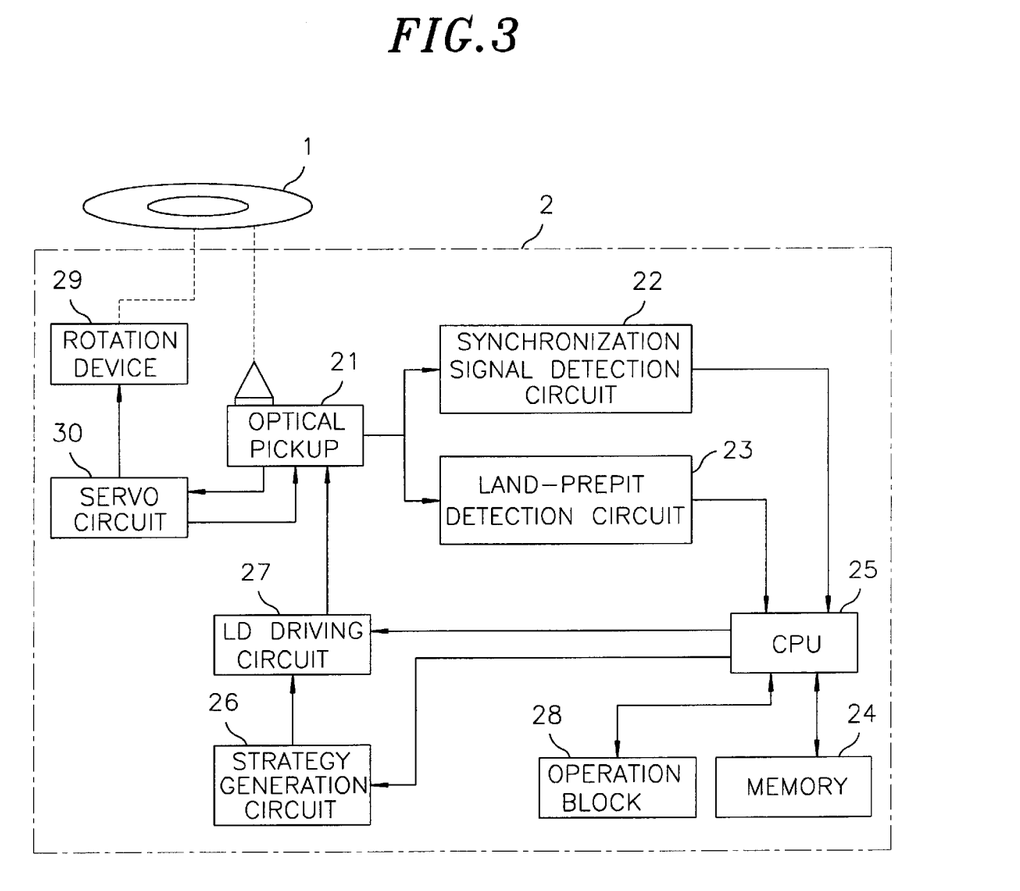
FIG. 3 is a block diagram for illustrating an optical information recording apparatus in accordance with the present invention.

Referring to FIG. 3, there is illustrated a block diagram representing an optical information recording system in accordance with the present invention. The system includes, e.g., a dye-based recordable optical disc 1, which is generally referred to as a DVD-recordable (DVD-R), and an optical information recording apparatus 2.

The optical information recording apparatus 2 includes an optical pickup 21, a synchronization signal detection circuit 22, a land-prepit detection circuit 23, a memory 24, a central control block 25 implemented by a central processing unit (CPU), a strategy generation circuit 26, a laser diode (LD) driving circuit 27, an operation block 28, a rotating device 29 and a servo circuit 30.

On the recording area of the optical disc 1, there is formed a wavy track in the form of a spiral. From the wobble of the track, a disc rotation control signal or a prepit detection signal, i.e., a timing signal for detecting a land-prepit signal which corresponds to prepits formed on the land, can be extracted.

The optical pickup 21 includes a laser diode (LD), a four-divisional photodetector, an actuator for an object lens and so on. The optical pickup 21 moves along the radial direction of the optical disc 1, e.g., by a linear motor type slidable transport mechanism (not shown), under the control of the CPU 25.

The servo circuit 30 receives a signal reproduced at the optical pickup 21 and then provides a control signal to the optical pickup 21, driving a focusing servo, i.e., a servo for adjusting a focus of a laser spot on the recording surface of the disc, and a tracking servo, i.e., a servo for tracing the track which represents a position on which pits are to be formed.

The servo circuit 30 provides the rotating device 29 with the control signal for spindle control, rotating the optical disc with a constant angular velocity (CAV), a constant linear velocity (CLV) and so on.

The synchronization signal detection circuit 22 detects the wobble of the track based on a reproduced signal outputted from the optical pickup 21, reproducing the disc rotation control signal and the prepit detection signal from the wobble and outputs to the central control block 25.

The land prepit detection circuit 23 detects the land prepit based on the reproduced signal outputted from the optical pickup 21, and outputs to the CPU 25.

The memory 24 is implemented by a memory device, such as a semiconductor memory device, a magnetic disc or an optical disc, and a control circuit thereof; and stores required strategy data sets of a recording pulse, e.g., determined experimentally in accordance with the present invention.

Each strategy data set is stored for every corresponding disccode identifying a type of a disc. Further, for every different information recording velocity (e.g., linear velocity), each strategy data set includes strategy setting data, initial values of recording and bottom powers and a matching coefficient β. The strategy setting data represents a modified shape of recording pulses and includes information required to set up, for example, a serrated pulses, comb-shape pulses or the like. The recording power is a power or an intensity of the laser beam applied when pits are formed during the recording of the optical information and the bottom power is a power or an intensity of the laser beam applied when pits are not formed during the recording of the optical information.

Figure 4A:
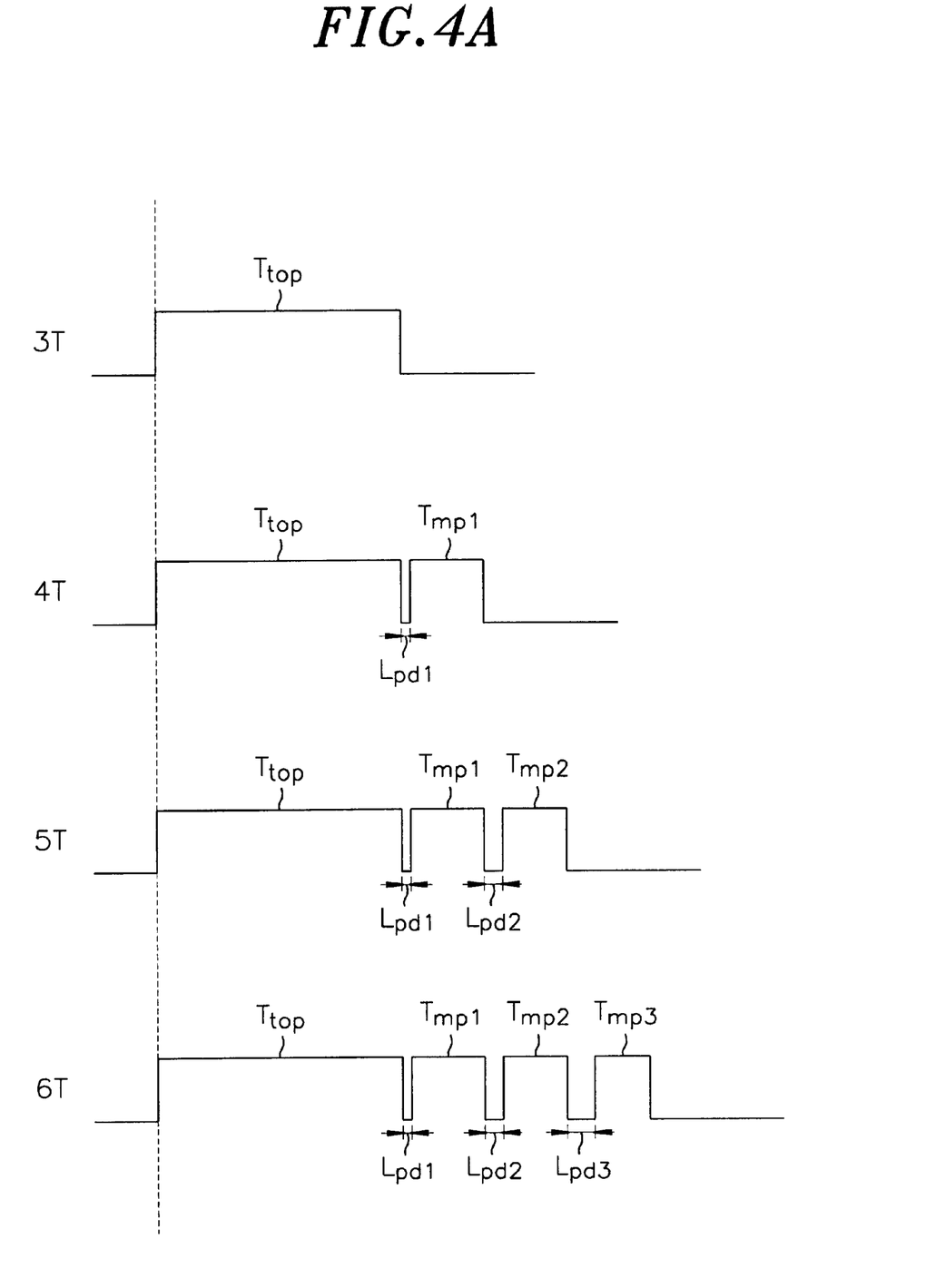
FIGS. 4A, 4B and 4C show a diagram for setting strategies in accordance with the present invention.
Figure 4B:
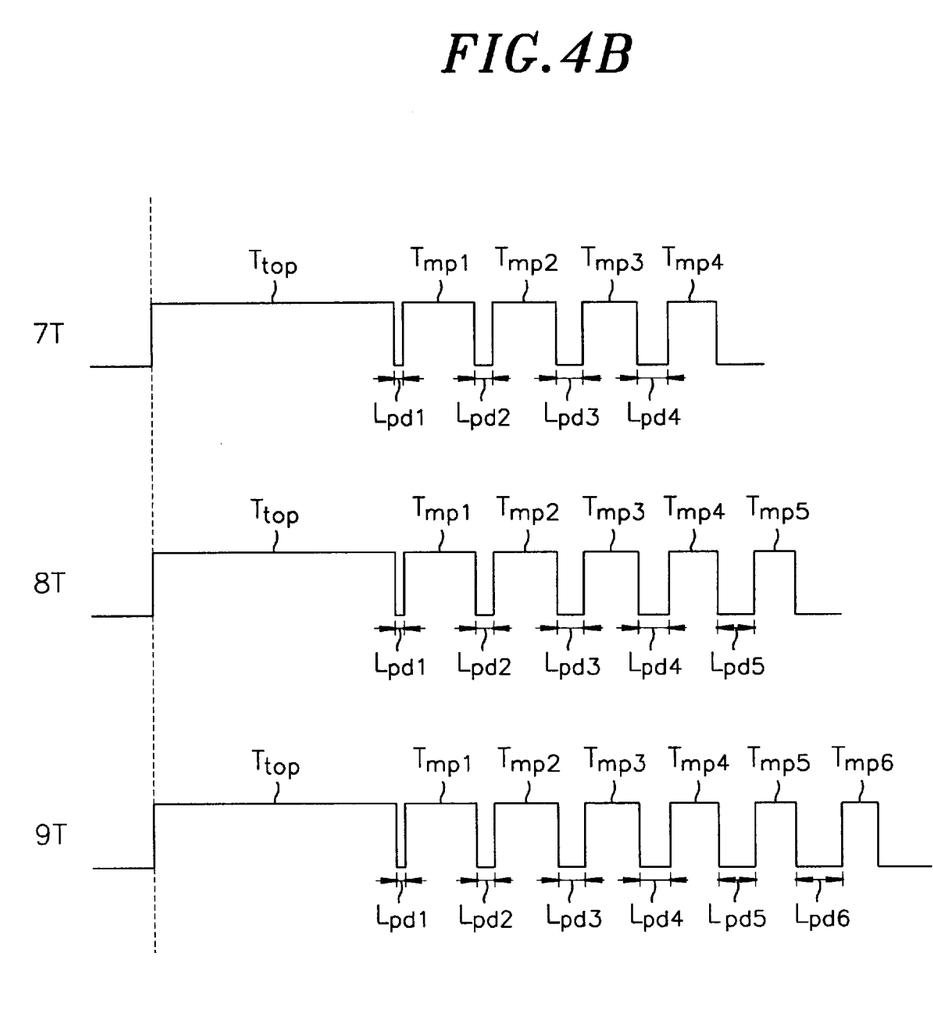
Figure 4C:
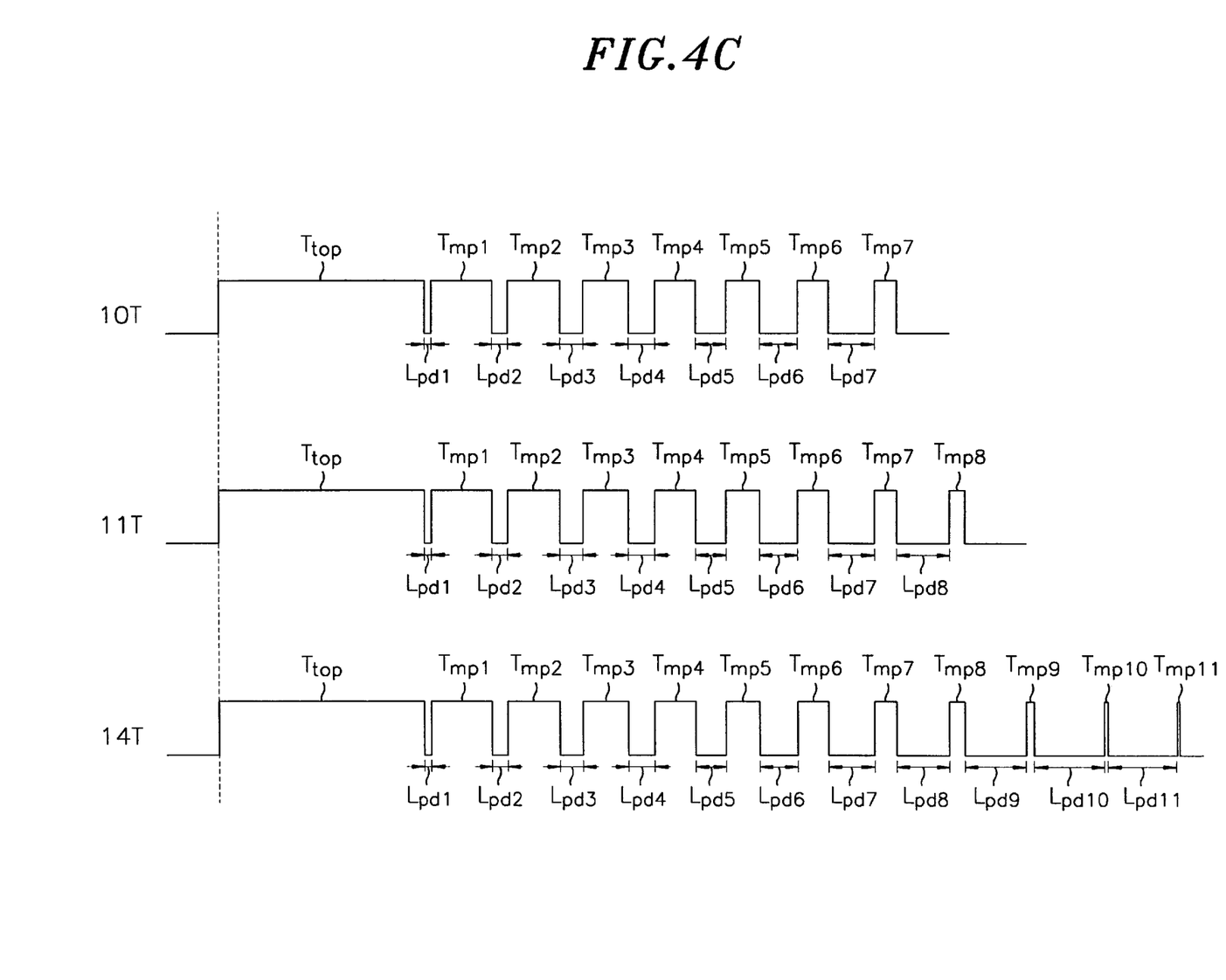

As shown in FIGS. 4A, 4B and 4C, the strategy setting data for each recording pulse also includes information on pulse widths for a top pulse $T_{top}$ and a multiple pulse set $T_{mp1}$ to $T_{mpN}$ and a pulse interval set $L_{pd1}$ to $L_{pdN}$, N being an integer, wherein a pulse interval is specified for each two neighboring pulses.

In the present embodiment, pulse widths for a top pulse $T_{top}$ and a multiple pulse set $T_{mp1}$ to $T_{mpN}$ and a pulse interval set $L_{pd1}$ to $L_{pdN}$ are defined for each corresponding pit with each length in a range of 3 T to 14 T, N being an integer.

The pulse width of the top pulse $T_{top}$ is preferably 3 T.

The summation of the pulse width $T_{mpN}$ and the pulse interval $L_{pdN}$ is set to be equal to one unit pit length T, and the pulse widths $T_{mpN}$'s are set to be smaller sequentially based on the distance from the top pulse $T_{top}$.

The CPU 25 identifies the type of the optical disc and the recording velocity inputted from the operation block 28 by an operator; selects a strategy data set corresponding to the type of the optical disc and the recording velocity; and sets the strategy generation circuit 26 and the LD driving circuit 27 with the strategy setting data of the recording pulse and initial values of recording and bottom powers obtained based on the selected strategy data set, respectively.

Next, the CPU 25 performs optimum power control (OPC) Thereafter, the CPU 25 sets the LD driving circuit 27 with the values of recording and bottom powers determined based on the OPC; generates a digital signal corresponding to the optical information to be recorded; and outputs the digital signal to the strategy generation circuit 26 to thereby record the optical information.

The strategy generation circuit 26 modifies the digital signal to be recorded, which is fed from the CPU 25, based on the strategy setting data selected from the CPU 25 to thereby provide the recording pulse to the LD driving circuit 27.

The LD driving circuit 27 drives the laser diode based on the recording pulse fed from the strategy generation circuit 26 to irradiate the laser beam onto the optical disc 1 with the recording and the bottom powers set by the CPU 25. In recording the optical information under the control of the LD driving circuit 27, the laser diode in the optical pickup 21 radiates the laser beam of the recording power for enabling the pit formation when the recording pulse is at the high level, and radiates the laser beam of the bottom power for preventing the pit from being formed (i.e., enabling the land formation) when the modified recording signal is at the low level.

Figure 6:
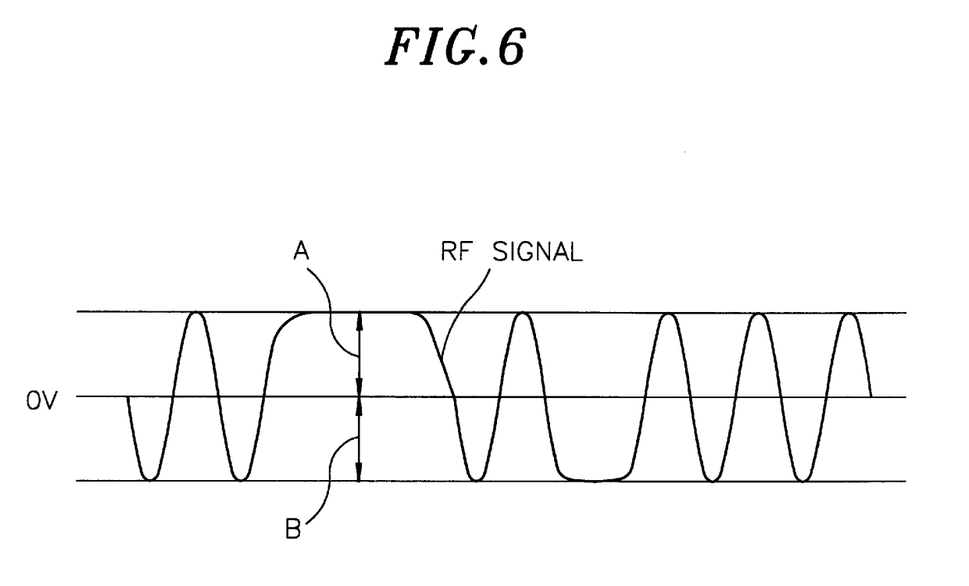
FIG. 6 shows a wave form for illustrating the definition of a matching coefficient β in accordance with the present invention.

The matching coefficient β is a measure of desired quality of the pits and lands formed in the optical disc, which is obtained from the output of the photodetector. With all of the focusing, the tracking and the spindle servos operated, the reproduced signal is detected from the OPC area of the optical disc 1 used in performing OPC, wherein the reproduced signal represents an RF signal, i.e., a voltage waveform when an I-E conversion is performed on a sum of four output currents of the four-divisional photodetector included in the optical pickup, and, then, the matching coefficient β can be described based on all of the amplitudes of the reproduced signal as follows:

$$\beta = \frac{A - B}{A + B}$$

wherein A is the amplitude magnitude of the positive portion of the RF signal with the RF signal AC-coupled and B is the amplitude magnitude of the negative portion of the RF signal with the RF signal AC-coupled.

During reproduction or playback of the recorded optical information, the LD driving circuit 27 drives the laser diode to generate the laser beam of an intensity, e.g., about 0.7 mW, which is lower than the bottom power.

Figure 5:
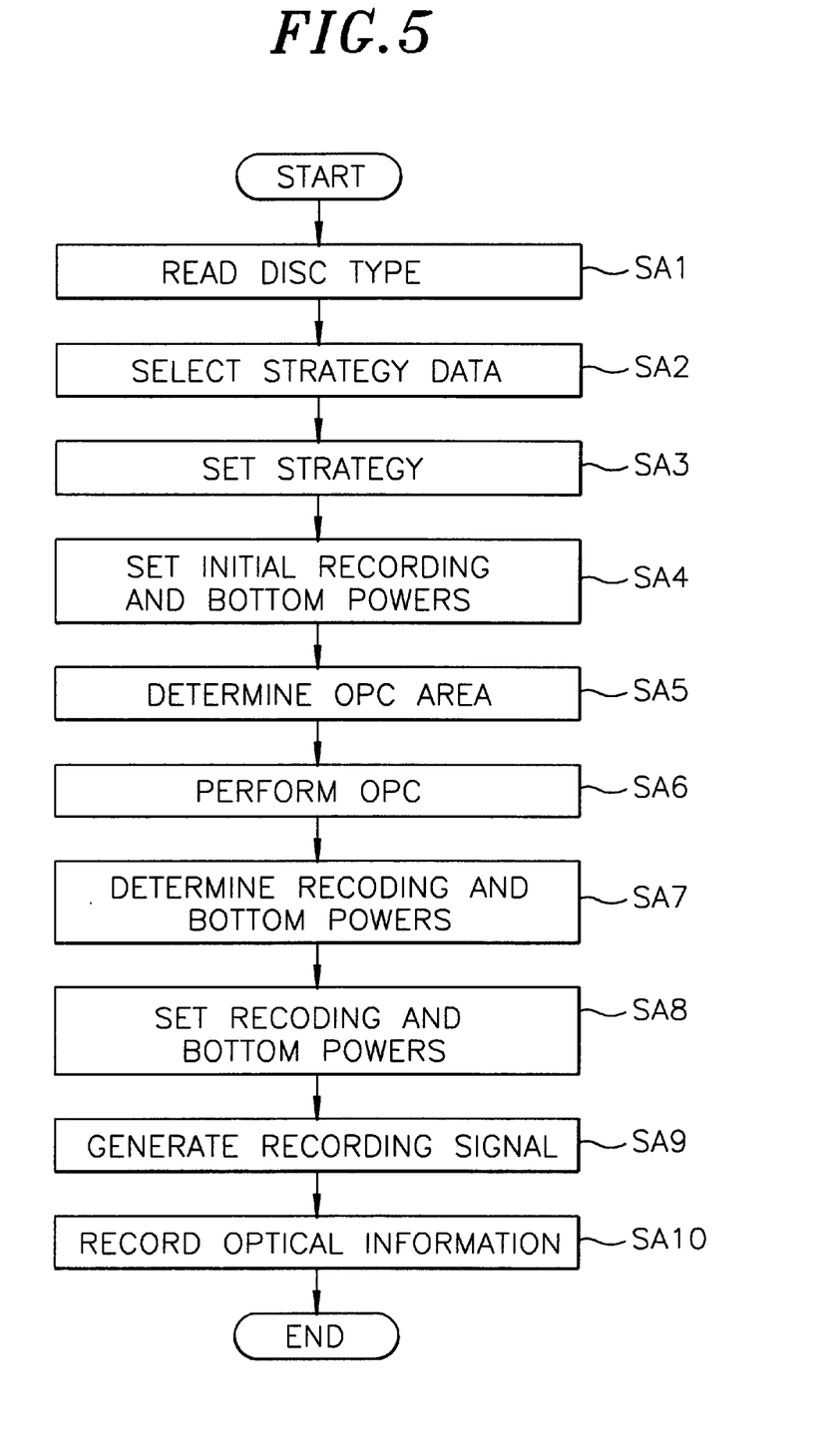
FIG. 5 shows a flow chart for illustrating an optical information recording method in accordance with the present invention.

The operation of the optical information recording apparatus 2 having the aforementioned configuration will be described in detail with reference to the flow chart of FIG. 5.

When optical information to be recorded is determined and the recording is initiated by an operator, the CPU 25 reads an optical disc type fed from the operation block 28 (SA1) and selects a strategy data set corresponding to the optical disc type from the contents of the memory 24 (SA2). Thereafter, the CPU 25 sets the strategy generation circuit 26 with strategy setting data defined in the selected strategy data set (SA3).

The CPU 25 sets the LD driving circuit 27 with the initial values of recording and bottom powers specified in the selected strategy data set (SA4).

As described above, the strategy setting data, the initial values of recording and bottom powers and a matching coefficient β are specified for every possible linear velocity in the strategy data set, allowing the corresponding initial values of recording and bottom powers and the matching coefficient β to be selected for that particular linear velocity to be used in recording the optical information. In other words, the strategy data set can be properly selected based on the type of the optical disc 1.

The CPU 25 determines an OPC area of the optical disc 1 to be used in performing OPC (SA5); and performs the OPC (SA6)

The OPC is performed by recording predetermined test information in a power calibration area (PCA) of the optical disc 1 and then by reproducing the recorded test information.

In the preferred embodiment of the invention, laser powers of different sets can be set to have recording powers identical to the initial recording power while varying the bottom powers around the selected initial bottom power, or vice versa. Optionally, both the recording and the bottom powers can be set to vary there around to have different values from those of the initial recording and bottom powers.

The CPU 25 determines optimum recording and the bottom powers based on the OPC results (SA7) and sets the LD driving circuit with the determined optimum recording and bottom powers (SA8).

Determination scheme of the laser powers based on the OPC results is well known in the art and, therefore, will not be repeated herein for the sake of simplicity. However, it is to be understood to one skilled in the art that laser powers in a set producing a best recording quality are selected as the optimum recording and bottom powers. In this embodiment, a set of laser powers yielding a matching coefficient closest to the one selected based on the disc type and the recording velocity is preferably determined as the set producing the best recording quality. Alternatively, laser powers of a set producing reproduced test information identical to the recorded test information can be determined as the optimum power. The optimum power also can be estimated from OPC data (i.e., the matching coefficients produced by the sets of laser powers used in the OPC) such that the estimated optimum recording and bottom powers are expected to have a matching coefficient identical to that corresponding to the linear velocity to be used as specified in the selected strategy data set.

Subsequently, the CPU 25 performs the eight-to-fourteen modulation (EFM) or eight-to-sixteen modulation on the optical information to be recorded to generate a digital signal (recording signal) (SA9) and provides same to the strategy generation circuit 26 to record the optical information (SA10).

In accordance with the method for recording optical information as described above, In order for a pit to be formed on the optical disc 1 with each recording pulse corresponding to a period during which the pit is formed, almost all of the excessive thermal energy transferred onto the recording medium is used, thereby allowing the pit to be formed with a necessary and sufficient shape on an appropriate position. Since, further, the pit would not have the shape of a tear, the optical information can be recorded with a good reproduction characteristic.

That is, when a pit is formed on the optical disc 1 with each recording pulse corresponding to a period during which the pit is formed, excessive thermal energy is transferred into the recording mediumso that the excessive thermal energy can contribute greatly to the formation of the following pit.

Since, further, the amount of excessive thermal energy transferred into the optical disc 1 is essentially higher with the increased pulse number of the multiple pulse set, the excessive thermal energy accumulated within the optical disc 1 increases at the later portion of the pit. Accordingly, the pit can be formed even though the amount of the excessive thermal energy transferred into the optical disc 1 by the irradiation of the laser beam becomes smaller at the later portion of the pit.

Figure 1:
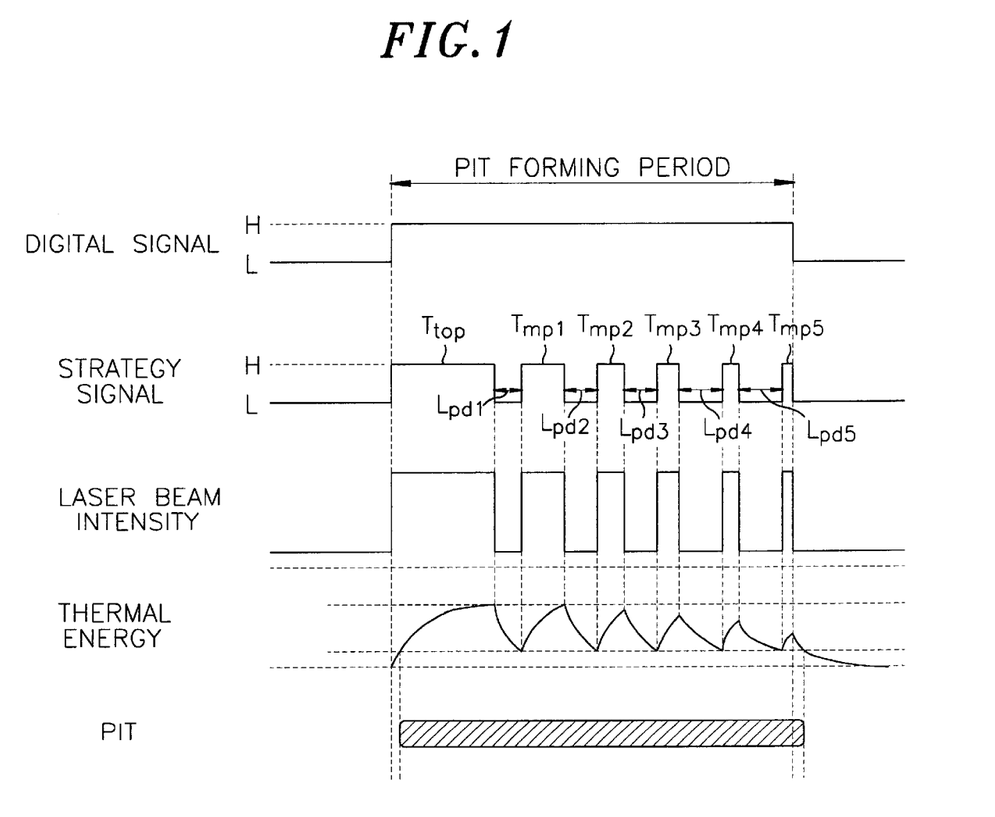
FIG. 1 illustrates a method for recording optical information in accordance with the present invention.

As a result, pulse widths of the multiple pulse set $T_{mp1}$ to $T_{mpN}$ may be set to be smaller sequentially based on the distance from the top pulse $T_{top}$, so that almost all of the excessive thermal energy can be used, thereby allowing the pit to be formed with a necessary and sufficient shape. Therefore, the pit would not have the shape of a tear.

In a preferred embodiment, pulse intervals of the pulse interval set $L_{pd1}$ to $L_{pdN}$ may be set to be wider sequentially based on the distance from the top pulse $T_{top}$ so that the excessive thermal energy may be effectively used to form the pit.

In addition, if pulse widths of the pulses corresponding to more than about half of the pulse number of the multiple pulse set $T_{mp1}$ to $T_{mpN}$ are set to be smaller sequentially based on the distance from the top pulse $T_{top}$, the excessive thermal energy can be adjusted which will, in turn, allow the shape of the pit to be also adjusted.

In a preferred embodiment, pulse widths of the pulses except the last pulse (i.e., $T_{mp3}$ for a pit with a length of 6 T, $T_{mp4}$ for a pit with a length of 7 T, $T_{mp5}$ for a pit with a length of 8 T, $T_{mp6}$ for a pit with a length of 9 T, $T_{mp7}$ for a pit with a length of 10 T, $T_{mp8}$ for a pit with a length of 11

T and $T_{mpN}$ for a pit with a length of 14 T) can be set to be smaller sequentially based on the distance from the top pulse $T_{top}$.

In this case, the pulse width of the last pulse is set to be different from those of the preceding pulses so that the excessive thermal energy can be adjusted, which will, in turn, allow the shape of the pit to be also adjusted.

In addition, for pulses corresponding to more than about half of the pulse number of the multiple pulse set $T_{mp1}$ to $T_{mpN}$, pulse intervals between each pulse and the preceding pulse thereof are set to be larger sequentially based on the distance from the top pulse $T_{top}$ so that the excessive thermal energy can be adjusted, which will, in turn, allow the shape of the pit to be also adjusted.

In a preferred embodiment, pulse intervals between each pulse of the pulses except the last pulse (i.e., $T_{mp3}$ for a pit with a length of 6 T, $T_{mp4}$ for a pit with a length of 7 T, $T_{mp5}$ for a pit with a length of 8 T, $T_{mp6}$ for a pit with a length of 9 T, $T_{mp7}$ for a pit with a length of 10 T, $T_{mp8}$ for a pit with a length of 11 T and $T_{mp11}$ for a pit with a length of 14 T) and the preceding pulse thereof can be set to be larger sequentially based on the distance from the top pulse $T_{top}$.

In this case, the excessive thermal energy maybe effectively contributed to form the pit by adjusting the pulse intervals. Further, the pulse interval related with the last pulse is set to be different from those related with the preceding pulses thereof so that the excessive thermal energy can be adjusted, which will, in turn, allow the shape of the pit to be also adjusted.

While the present invention has been described with respect to the particular embodiments, it will be apparent to those skilled in the art that various changes and modifications may be made without departing from the spirit and scope of the invention as defined in the following claims.

What is claimed is:

1. A method for recording optical information on an optical information recording medium based on a digital signal which has a first intensity level representing a period for forming a pit and a second intensity level representing a period for not forming the pit, the method comprising the steps of:

generating a recording pulse which includes a top pulse and a multiple pulse set following the top pulse while the digital signal corresponds to the first intensity level; and irradiating a laser beam onto the optical information recording medium based on the recording pulse, thereby forming an optically detectable pit having a length corresponding to the first intensity level, characterized in that pulse widths of pulses within the multiple pulse set are set to be sequentially smaller based on the distance from the top pulse.

2. The method of claim 1, wherein the number of the pulses within the multiple pulse set is more than 2 and the setting of the pulse widths is performed on equal to or more than a half of the pulses within the multiple pulse set.

3. The method of claim 1, wherein a pulse width of a last pulse of the multiple pulse set is set to be separately adjusted from pulse widths of other pulses.

4. The method of claim 2, wherein a pulse width of a last pulse of the multiple pulse set is set to be separately adjusted from pulse widths of other pulses.

5. A method for recording optical information on an optical information recording medium based on a digital signal which has a first intensity level representing a period for forming a pit and a second intensity level representing a period for not forming the pit, the method comprising the steps of:

generating a recording pulse which includes a top pulse and a multiple pulse set following the top pulse while the digital signal corresponds to the first intensity level; and irradiating a laser beam onto the optical information recording medium based on the recording pulse, thereby forming an optically detectable pit having a length corresponding to the first intensity level, characterized in that pulse intervals of pulses within the multiple pulse set are set to be sequentially larger based on the distance from the top pulse.

6. The method of claim 5, wherein the number of the pulses within the multiple pulse set is more than 2 and the setting of the pulse intervals is performed on equal to or more than a half of the pulses within the multiple pulse set.

7. The method of claim 5, wherein a pulse interval concerning a last pulse is set to be separately adjusted from pulse intervals of other pulses.

8. The method of claim 6, wherein a pulse interval concerning a last pulse is set to be separately adjusted from pulse intervals of other pulses.

9. An apparatus for recording optical information on an optical information recording medium based on a digital signal which has a first intensity level representing a period for forming a pit and a second intensity level representing a period for not forming the pit, the apparatus comprising:

a recording pulse generator for generating a recording pulse which includes a top pulse and a multiple pulse set following the top pulse while the digital signal corresponds to the first intensity level, wherein pulse widths of pulses within the multiple pulse set are set to be sequentially smaller based on the distance from the top pulse; and a light source for irradiating a laser beam with a pulse shape onto the optical information recording medium based on the recording pulse, thereby forming an optically detectable pit having a length corresponding to the first intensity level on the optical information recording medium.

10. The apparatus of claim 9, wherein the number of the pulses within the multiple pulse set is more than 2 and the setting of the pulse widths is performed on equal to or more than a half of the pulses within the multiple pulse set.

11. The apparatus of claim 9, wherein a pulse width of a last pulse of the multiple pulse set is set to be separately adjusted from pulse widths of other pulses.

12. The apparatus of claim 10, wherein a pulse width of a last pulse of the multiple pulse set is set to be separately adjusted from pulse widths of other pulses.

13. An apparatus for recording optical information on an optical information recording medium based on a digital signal which has a first intensity level representing a period for forming a pit and a second intensity level representing a period for not forming the pit, the apparatus comprising:

a recording pulse generator for generating a recording pulse which includes a top pulse and a multiple pulse set following the top pulse while the digital signal corresponds to the first intensity level, wherein pulse intervals of pulses within the multiple pulse set are set to be sequentially larger based on the distance from the top pulse; and a light source for irradiating a laser beam with a pulse shape onto the optical information recording medium based on the recording pulse, thereby forming an optically detectable pit having a length corresponding to the first intensity level on the optical information recording medium.

14. The apparatus of claim 13, wherein the number of the pulses within the multiple pulse set is more than 2 and the setting of the pulse intervals is performed on equal to or more than a half of the pulses within the multiple pulse set.

15. The apparatus of claim 13, wherein a pulse interval concerning a last pulse is set to be separately adjusted from pulse intervals of other pulses.

16. The apparatus of claim 14, wherein a pulse interval concerning a last pulse is set to be separately adjusted from pulse intervals of other pulses.

17. The method of claim 1, wherein a summation of each pulse width and its corresponding pulse interval is set to be substantially equal to one unit pit length.

18. The method of claim 5, wherein a summation of each pulse width and its corresponding pulse interval is set to be substantially equal to one unit pit length.

19. The apparatus of claim 9, wherein a summation of each pulse width and its corresponding pulse interval is set to be substantially equal to one unit pit length.

20. The apparatus of claim 13, wherein a summation of each pulse width and its corresponding pulse interval is set to be substantially equal to one unit pit length.

* * * * *

UNITED STATES PATENT AND TRADEMARK OFFICE
CERTIFICATE OF CORRECTION

PATENT NO. : 6,480,450 B1
DATED : November 12, 2002
INVENTOR(S) : Toru Fujii et al.

It is certified that error appears in the above-identified patent and that said Letters Patent is hereby corrected as shown below:

<u>Title page,</u>
Item [30], Foreign Application Priority Data, please add:
-- January 27, 1999 (JP) 11-018060 --

Signed and Sealed this

Twentieth Day of May, 2003

JAMES E. ROGAN
*Director of the United States Patent and Trademark Office*